United States Patent
Langheck et al.

(10) Patent No.: US 12,273,062 B2
(45) Date of Patent: Apr. 8, 2025

(54) METHOD FOR MODULATING TORQUE RIPPLE AND/OR RADIAL FORCE OF A THREE-PHASE CURRENT OPERATED ELECTRIC MACHINE

(71) Applicant: Schaeffler Technologies AG & Co. KG, Herzogenaurach (DE)

(72) Inventors: Andreas Langheck, Karlsruhe (DE); Dominik Stretz, Wiesengiech (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 113 days.

(21) Appl. No.: 18/024,348

(22) PCT Filed: Aug. 10, 2021

(86) PCT No.: PCT/DE2021/100680
§ 371 (c)(1),
(2) Date: Mar. 2, 2023

(87) PCT Pub. No.: WO2022/048704
PCT Pub. Date: Mar. 10, 2022

(65) Prior Publication Data
US 2023/0336107 A1    Oct. 19, 2023

(30) Foreign Application Priority Data

Sep. 4, 2020   (DE) .................... 10 2020 122 099.5

(51) Int. Cl.
*H02P 6/18*    (2016.01)
*H02P 21/05*   (2006.01)
(Continued)

(52) U.S. Cl.
CPC .............. *H02P 29/50* (2016.02); *H02P 21/05* (2013.01); *H02P 21/22* (2016.02);
(Continued)

(58) Field of Classification Search
CPC .......... H02P 29/50; H02P 21/22; H02P 21/05; H02P 2101/45; H02P 2103/20; H02P 2205/01; H02P 6/183
See application file for complete search history.

(56) References Cited

U.S. PATENT DOCUMENTS

| | | | |
|---|---|---|---|
| 2009/0237014 A1* | 9/2009 | Yamada | ................... H02P 21/16 318/400.23 |
| 2013/0300334 A1* | 11/2013 | Tooyama | ................ H02P 29/50 318/504 |
| 2017/0264227 A1* | 9/2017 | Shigeta | ................... H02P 6/183 |

FOREIGN PATENT DOCUMENTS

| | | |
|---|---|---|
| DE | 102012107970 A1 | 2/2013 |
| DE | 102012217412 A1 | 4/2013 |
| EP | 2779414 A2 | 9/2014 |

* cited by examiner

*Primary Examiner* — Cortez M Cook

(57) ABSTRACT

A method for modulating a torque ripple and/or the a radial force of a three-phase current-operated electric machine includes selecting at least one of a harmonic (HM1_EM) in a torque of the electric machine and a harmonic (HM_X) of a load coupled to the electric machine.

The at least one selected harmonic (HM1_EM, HM_X) is modulated by applying the at least one selected harmonic (HM1_EM, HM_X) to a d-current and/or a q-current or to a variable correlated therewith in order to generate a setpoint variable for driving the electric machine. A phase angle ($\varphi_{d,k}$, $\varphi_{q,k}$) of the at least one of a harmonic ($H_{Id}$) in the d-current and a harmonic ($H_{Iq}$) in the q-current is at least temporarily set to be different with respect to a rotor angle, such that $\varphi_{d,k} \neq \varphi_{q,k}$ applies.

18 Claims, 6 Drawing Sheets

(51) Int. Cl.
    *H02P 21/22*       (2016.01)
    *H02P 29/50*       (2016.01)
    *H02P 101/45*     (2016.01)
    *H02P 103/20*     (2016.01)

(52) U.S. Cl.
    CPC ...... *H02P 2101/45* (2015.01); *H02P 2103/20* (2015.01); *H02P 2205/01* (2013.01)

METHOD FOR MODULATING TORQUE RIPPLE AND/OR RADIAL FORCE OF A THREE-PHASE CURRENT OPERATED ELECTRIC MACHINE

CROSS-REFERENCE TO RELATED APPLICATIONS

This application is the U.S. National Phase of PCT Appln. No. PCT/DE2021/100680 filed Aug. 10, 2021, which claims priority to DE 102020122099.5 filed Sep. 4, 2020, the entire disclosures of which are incorporated by reference herein.

TECHNICAL FIELD

The present disclosure relates to a method for modulating a torque ripple and/or a radial force of a three-phase current-operated electric machine, in particular of an electric drive machine of a motor vehicle able to be driven by an electric motor.

BACKGROUND

DE 10 2014 208 384 A1 describes a method for reducing gear meshing noise of an electrically drivable drive train with a toothed gear transmission and an electric motor. The method comprises the following method steps: determining an operating state of the drive train, reading out a data set associated with the determined operating state from a data memory, and adjusting a torque of the electric motor according to the data set. It is proposed that a torque signal be applied to the transmission, which counteracts the vibration or the noise of the transmission. The signal for the compensation torque is added to other desired torques, such as a static drive torque.

DE 10 2014 007 502 A1 describes a method for noise modulation of an electric motor, wherein the electric motor is a three-phase synchronous motor which is driven using vector control by means of a motor control unit, wherein actual values for the rotated current components id and iq are obtained in a controlled system, wherein id corresponds to the magnetizing current and iq corresponds to the torque-forming current of the synchronous motor, and wherein the actual values are compared with specified reference variables (iq_set, id_set). The differences between the actual values and the reference variables are converted into manipulated variables via a first controller and a first transformation stage in a duty cycle for a PWM generator in order to regulate the actual values (iq, id) to the reference variables (iq_set, id_set). In addition, the current component (id) forming the magnetizing current is adjusted to a desired acoustic state by means of an acoustics controller according to an acoustic state that has been measured by a measuring device and forwarded to the motor control unit by means of a signal output.

Furthermore, DE 10 2009 000 928 A1 describes a method for reducing torque ripple in an electric motor. The method comprises receiving a torque command and determining a cancellation current command based on the torque command. The method further comprises generating a harmonic cancellation command based on the cancellation current command, wherein the harmonic cancellation command compensates for a phase shift and a damping induced by the current-regulated control module, and wherein the current-regulated control module is coupled to an inverter which is coupled to the electric motor. The method further comprises providing the harmonics cancellation command to the current-regulated control module, wherein the current-regulated control module is configured to control the inverter in response to the harmonics cancellation command and the torque command.

SUMMARY

The present disclosure, according to an exemplary embodiment, provides a method for modulating a torque ripple and/or a radial force of a three-phase current-operated electric machine, which is improved in respect of the modulation variety. Advantageously, a method is provided that, compared to typical methods, reduces the torque ripple or the radial forces of the electric drive machine occurring in a drive train of an electrically operable motor vehicle and thus further reduces noise emissions in the vehicle.

The method according to the disclosure comprises selecting at least one harmonic in a torque of the electric machine and/or selecting at least one harmonic of a component, coupled to the electric machine, of the drive train of the motor vehicle. According to the disclosure, the at least one selected harmonic is modulated by applying the at least one selected harmonic to a d-current and/or q-current or to a variable correlated therewith, such as a stator voltage of the electric machine or a magnetic flux within the electric machine, in order to generate a setpoint variable for driving the electric machine, wherein a phase angle of the harmonic of the d-current and/or a phase angle of the harmonic of the q-current with respect to a rotor angle is at least temporarily set to be different, such that the phase angle of the d-component is at least temporarily unequal to the phase angle of the q-component. As a result, a bandwidth of a modulation variety for influencing vibrations and/or noises generated by the electric machine or by components in the drive train of the motor vehicle is considerably increased and the possibilities for corresponding influencing are thus improved.

The method according to the disclosure thus reduces harmonics in the torque of the electric machine or in the drive train, in particular in a targeted manner, and thus vibrations and noises by applying harmonics to the d-current or the q-current. Instead of reducing harmonics, however, they can also simply be adjusted to the desired specifications. This current can be represented by amplitude and phase:

$$i_d^* = i_{d,1}^* + \sum_k^N i_{d,k} \cdot \cos(k\omega t + \varphi_{d,k})$$

$$i_q^* = i_{q,1}^* + \sum_k^N i_{q,k} \cdot \cos(k\omega t + \varphi_{q,k})$$

In embodiments of the disclosure, it is possible for at least one harmonic in the torque of the electric machine to be selected and/or at least one harmonic of a component coupled to the electric machine to be selected and the at least one selected harmonic to be modulated by applying the at least one selected harmonic to the d-current and/or q-current or to a variable correlated therewith for driving the electric machine with the proviso that the torque of the electric machine and/or the torque of the drive train is smoothed out, so that vibrations and noises are reduced. From all possible combinations of d-current and q-current that reduce harmonics in the torque in a targeted manner, there are those that result in the lowest current amplitude, voltage amplitude, loss amplitude, etc. This achieves the advantage that the torque of the electric machine or of the drive train connected to the electric machine can be smoothed out so that undesired vibrations and noise can be dampened in a significantly improved manner.

In embodiments of the disclosure, it is also possible for the d-current and/or the q-current to be selected in such a way that the magnitude of the resulting stator voltage $$|u|=\sqrt{u_d^2+u_q^2}$$

or the magnitude of the resulting stator current $$|i|=\sqrt{i_d^2+i_q^2}$$

are minimized, wherein the d-component of the stator voltage results as follows:

$$u_d = R \cdot i_d + \frac{d\Psi_d(i_d, i_q, \gamma)}{dt} - \omega \Psi_q(i_d, i_q, \gamma)$$

and wherein the q-component of the stator voltage results as follows:

$$u_q = R \cdot i_q + \frac{d\Psi_q(i_d, i_q, \gamma)}{dt} - \omega \Psi_d(i_d, i_q, \gamma).$$

In this regard, the magnitude of the induced voltage is dependent on the speed of the electric machine and the change in the magnetic flux in the same.

The torque $$M \approx \frac{3}{2} p \left( \Psi_d(i_d, i_q, \gamma) i_q^* + \Psi_q(i_d, i_q, \gamma) \cdot i_d^* \right)$$

of the electric machine is in turn dependent on the magnetic flux as well as the current in the d direction and the current in the q direction. This results in a significantly higher number of combinations which, in addition to the torque of the electric machine through $i_{d1}$ and $i_{q1}$, apply an additional torque through $i_{dk}$ and $i_{qk}$ ($M_k$). The current for the torque Mx can be selected using the previously described degrees of freedom in such a way that it satisfies additional conditions, such as a minimum magnitude for the stator voltage amplitude or a minimum magnitude for the stator current amplitude or the like. This provides the advantage that a smaller voltage space vector (by minimizing the stator voltage amplitude) also allows the electric machine to be operated close to the voltage limits—for example in a region of a lower voltage limit when a battery is already relatively empty—or in a region of a upper voltage limit when the electric machine is to be operated under full load for acceleration.

Furthermore, in embodiments of the disclosure, it is possible for a harmonic to be calculated for generating the setpoint variable, with the following method steps being carried out:
- modulating the torque or the radial force or a resulting oscillation of the electric machine with the aim of minimizing the torque ripple by taking into account the induced voltage and/or the radial forces or with the aim of minimizing the radial forces by taking into account the induced voltage, and
- generating torque ripple and/or radial forces by taking into account the induced voltage, and
- modulating the induced voltage by taking into account the torque ripple and/or the radial forces.

In embodiments of the disclosure, in order to generate a setpoint variable for driving the electric machine, it is possible for the d-current, the q-current as well as the d-phase angle and the q-phase angle to be read from a table.

Advantageously, variables can be read from four different tables to generate a setpoint variable for driving the electric machine, wherein two of the tables each contain amplitudes of d-variables and q-variables and wherein two further tables each contain the associated phases of the d-variables and the q-variables. Alternatively to this, in order to generate a setpoint variable for driving the electric machine, variables are read from four different tables, wherein two of the tables each contain real amplitude values of d-variables and q-variables and two further tables each contain imaginary amplitude values of the d-variables and the q-variables. A further possibility for generating a setpoint variable for driving the electric machine is that variables can be read from a table containing in particular only amplitude variables, wherein further required variables are determined according to a predetermined rule.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic in nature. Identical reference signs indicate the same objects so that explanations from other figures can also be used.

In the drawings.

DETAILED DESCRIPTION

Figure 1:
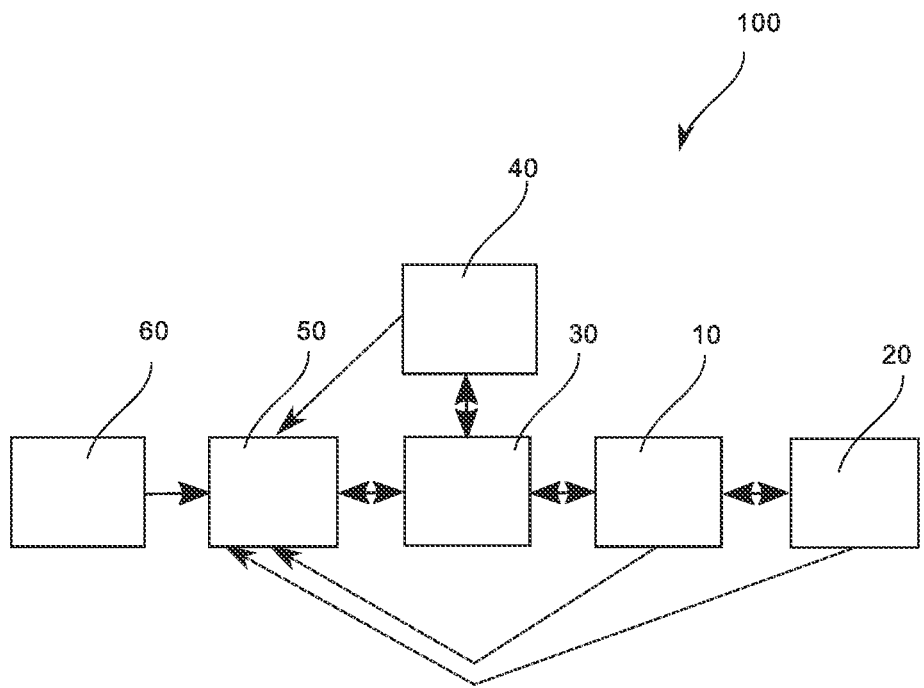
FIG. 1 shows a schematic representation of a drive train of an electrically drivable motor vehicle in a block diagram.

FIG. 1 shows a schematic representation of a drive train 100 of an electrically drivable motor vehicle in a block diagram. An electric machine 10 is mechanically coupled on an output side to a load 20, such as a drive axle of the motor vehicle. On an input side, the electric machine 10 is driven by a power electronics unit 30 which, for example, supplies stator windings of the electric machine 10 with three-phase current. For this purpose, the power electronics unit 30 is connected to an energy source 40, such as an onboard battery of the motor vehicle, wherein a DC voltage or direct current supplied by the battery is converted into three-phase current via corresponding inverters of the power electronics unit 30.

The power electronics unit 30 is connected via a further interface on an input side thereof to a control/regulation unit 50, which drives the power electronics unit 30 in accordance with setpoint specifications of a setpoint generator 60 connected to an input side of the control/regulation unit 50. In this regard, the control/regulation unit 50 is optionally provided via corresponding sensors with operating variables, which are important for driving the electric machine 10, of the electric machine 10, of the load 20 driven by the electric machine 10, and of the energy source 40 supplying the power electronics unit 30 or electric machine 10.

Figure 2:
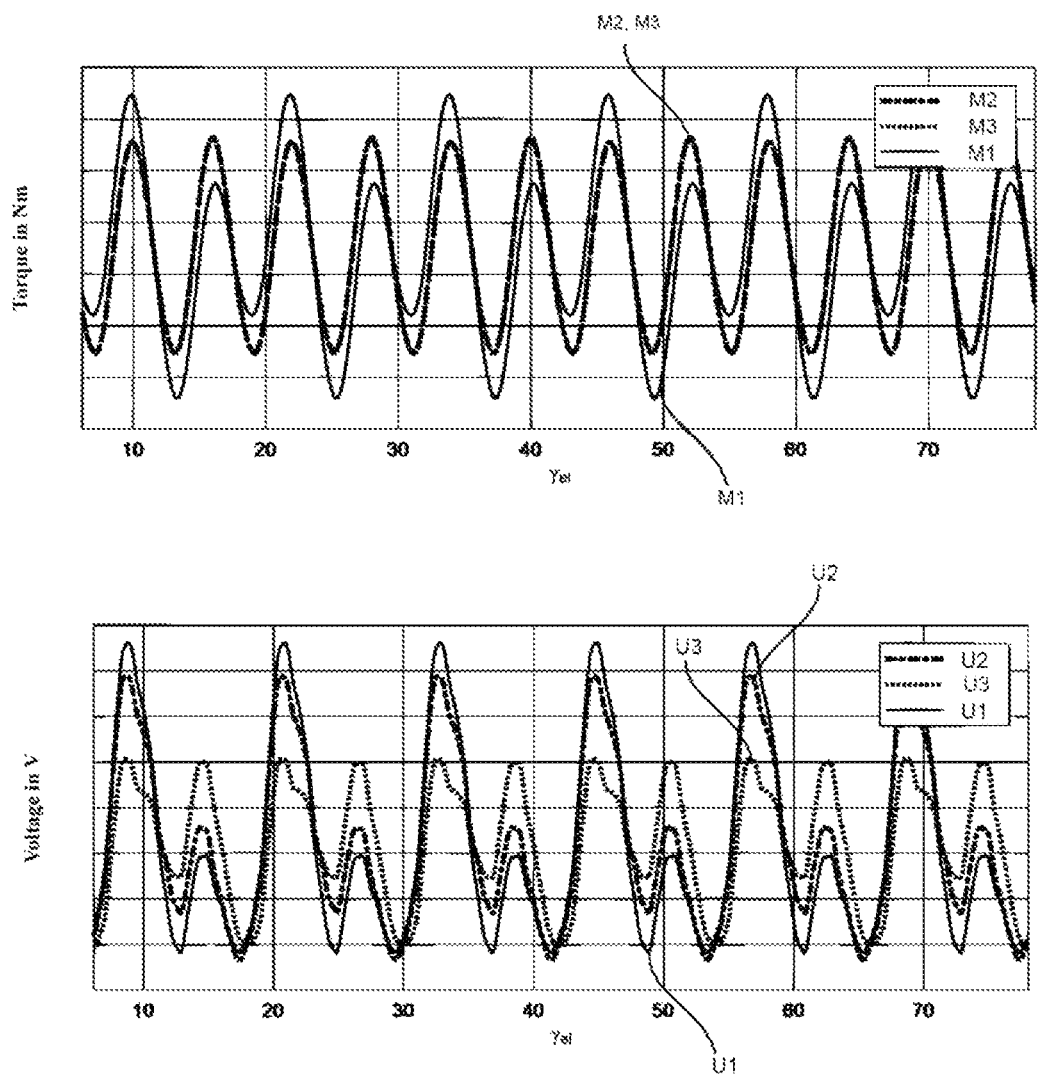
FIG. 2 shows, in the top representation, a torque curve of an electric machine with three different drive procedures and, in the bottom representation, voltage curves, associated with the torque curves shown in FIG. 2 above, on a stator of the correspondingly driven electric machine.

In the top representation, FIG. 2 shows a torque curve of an electric machine 10 with three different drive procedures. A first torque curve M1 (solid line) shows a torque that occurs when the electric machine 10 is driven with sinusoidal excitation without harmonic components according to conventional techniques. A second torque curve M2 (dash-dotted line) shows the torque curve that occurs in the case of sinusoidal excitation with standard harmonic components according to conventional techniques. Finally, a third torque curve M3 (dotted line) shows, in comparison with this, the torque curve that occurs in the case of sinusoidal excitation with harmonic components according to the disclosure, wherein the d-variables and/or the q-variables have a phase angle that is at least temporarily different from a rotor angle.

In the bottom representation, FIG. 2 shows voltage curves, associated with the torque curves shown in FIG. 2 above, on a stator of the correspondingly driven electric machine 10. A first voltage curve U1 (solid line) shows a voltage that occurs when the electric machine 10 is driven with sinusoidal excitation without harmonic components according to conventional techniques. A second voltage curve U2 (dash-dotted line) shows the voltage curve that occurs in the case of sinusoidal excitation with standard harmonic components according to conventional techniques. Finally, a third voltage curve U3 (dotted line) shows, in comparison with this, the voltage curve that occurs in the case of sinusoidal excitation with harmonic components according to the disclosure, wherein the d-variables and/or the q-variables have a phase angle that is at least temporarily different from the rotor angle. The example shown clearly indicates that the same torque can be provided with the method according to the disclosure as with conventional methods, wherein a significantly lower voltage amplitude is required.

Figure 3:
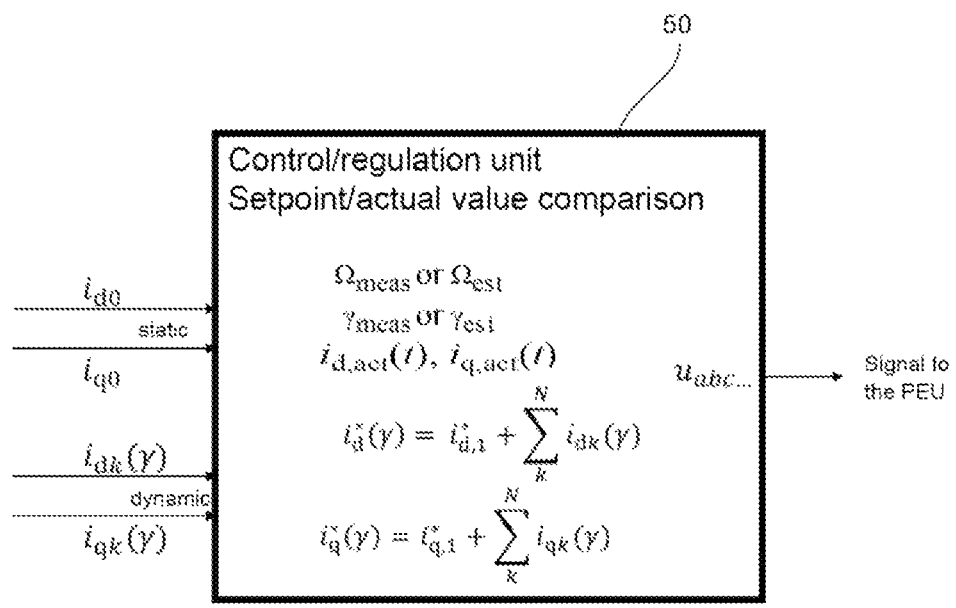
FIG. 3 shows the block diagram of a control and regulation unit from FIG. 1 in a more detailed representation.

FIG. 3 shows the block diagram of the control/regulation unit 50 from FIG. 1 in a more detailed representation. The control/regulation unit 50 is shown with its static input variables of d-current $i_{d0}$ and q-current $i_{q0}$ as well as with the dynamic d and q input variables $i_{dk}(\gamma)$ and $i_{dq}(\gamma)$ that change according to the rotor angle. On the output side, the setpoint variables $U_{a,b,c}$ for driving the power electronics unit 30 are shown. A setpoint/actual value comparison and the corresponding regulation are possible either with an additive component or by filtering out the dynamic part in the setpoint/actual value comparison and adding it up again during the subsequent adjustment process (so-called blind addition of the dynamic part as voltage).

Figure 4:
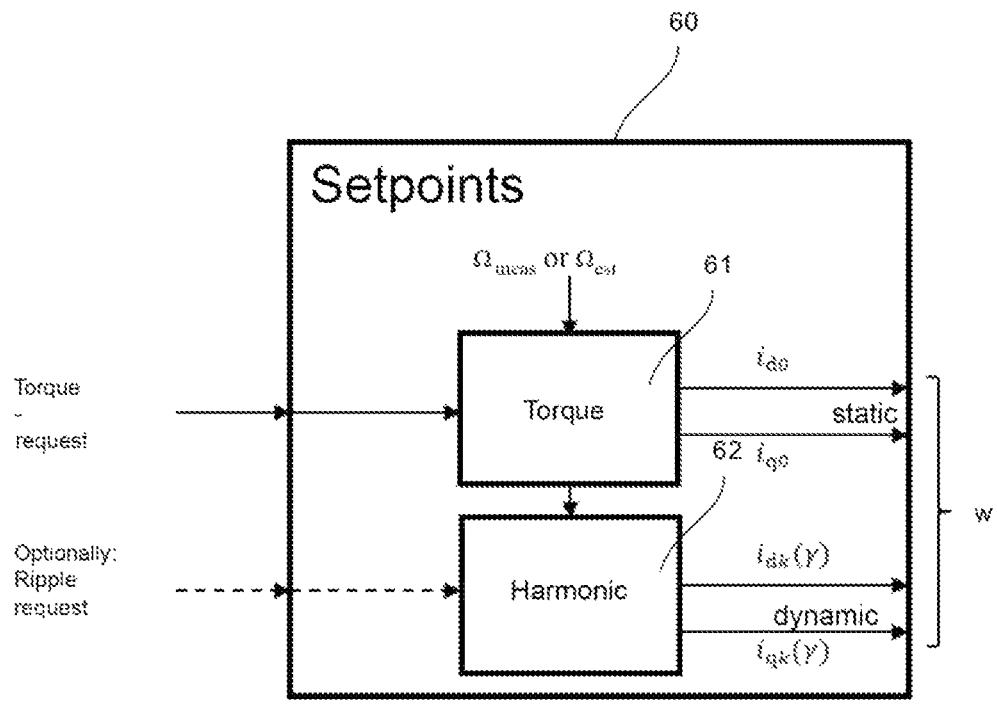
FIG. 4 shows the block diagram of a setpoint generator from FIG. 1 in a more detailed representation.

FIG. 4 shows the block diagram of the setpoint generator 60 for specifying setpoint values to the control/regulation unit 50 from FIG. 1 in a more detailed representation. The setpoint generator 60 shown provides the input variables for the control/regulation unit 50, which have already been explained above in relation to FIG. 3, on the output side thereof. The input variables are generated by modeling a torque request using a torque part 61, wherein a harmonic $H_{M1\_EM}$ in the torque of the electric machine 10 and/or a harmonic $H_{M\_X}$ of a load 20 of the drive train coupled to the electric machine 10 is/are selected. The at least one selected harmonic $H_{M1\_EM}$, $H_{M\_X}$ is then modulated by applying the at least one selected harmonic $H_{M1\_EM}$, $H_{M\_X}$ to the d-current and/or q-current in order to generate a setpoint variable w for driving the electric machine 10. The phase angle $\varphi_{d,k}$, $\varphi_{q,k}$ of the harmonic $H_{Id}$ in the d-current Id and/or of the harmonic $H_{Iq}$ in the q-current Iq with respect to the rotor angle ($\gamma$) is at least temporarily set to be different, such that $\varphi_{d,k} \neq \varphi_{q,k}$ applies. The phase angle (relative to the rotor angle) of the current (Id, Iq) can thus be set independently of Id and Iq, so it can be set to be different if this is advantageous.

The calculation strategy on which the harmonic part 62 is based includes at least the following parts:
 modulation of torque and/or radial forces;
 minimization of the torque ripple by taking into account the induced voltage and/or the radial forces;
 minimization of the radial forces by taking into account the torque ripple and/or the induced voltage;
 generation of torque ripples and/or radial forces by taking into account the induced voltage; and
 modulation of the induced voltage by taking into account the torque ripple and/or the radial forces.

The harmonic part 62 optionally receives input variables externally in the form of a ripple request and internally from the torque part 61. On the output side, both the static variables $i_{d0}$, $i_{q0}$ as input variables for the control/regulation unit 50 and the dynamic variables $i_{dk}(\gamma)$, $i_{dq}(\gamma)$ as input variables for the control/regulation unit 50 are then provided by the setpoint generator 60 using the torque part 61.

Figure 5:
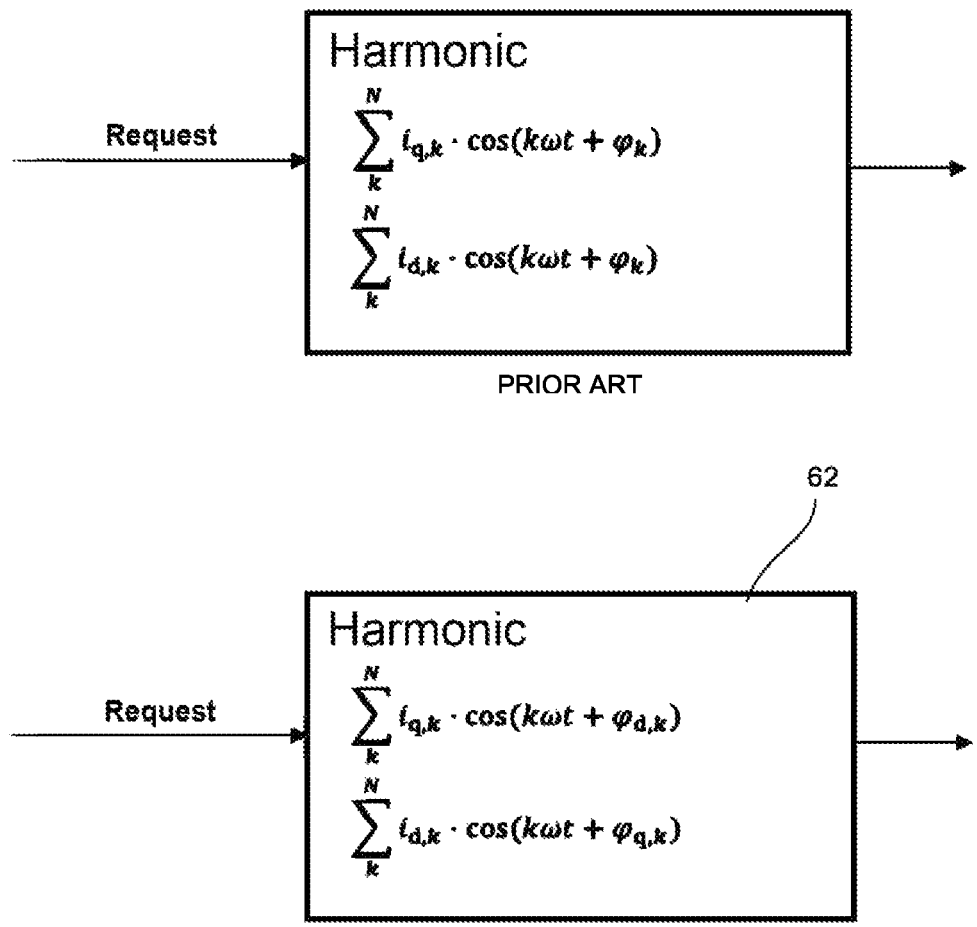
FIG. 5 shows the block diagram of a harmonics from FIG. 4 according to the prior art and according to the disclosure in a comparison.

FIG. 5 shows the block diagram of the harmonic part 62 from FIG. 4 according to the prior art (above) and according to the disclosure (below) in a comparison. It is easy to see that, according to the disclosure, the phase angles of the d-current and q-current are fundamentally different.

Figure 6:
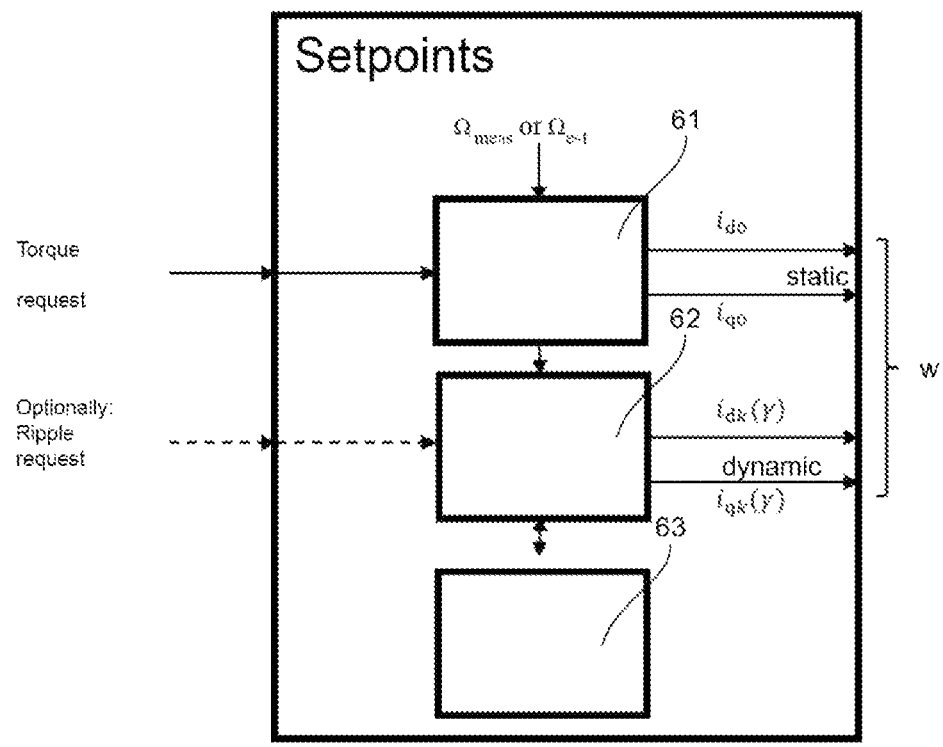
FIG. 6 shows the block diagram of the setpoint generator from FIG. 4 in an expanded representation.

FIG. 6 shows the block diagram of the setpoint generator 60 from FIG. 4 in an expanded representation. The representation of the setpoint generator 60 already shown and explained in FIG. 4 is expanded in this embodiment by a corresponding table part 63, using which to generate a setpoint variable w for driving the electric machine 10, for example, the d-current Id, the q-current Iq as well as the d-phase angle $\varphi_{d,k}$ and the q-phase angle $\varphi_{q,k}$ can be read from a table.

To generate a setpoint variable w for driving the electric machine 10, variables can be read from four different tables, wherein two of the tables each contain amplitudes of d-variables and q-variables and wherein two further tables each contain the associated phases of the d-variables and the q-variables. Alternatively, in order to generate a setpoint variable w for driving the electric machine 10, variables are read from four different tables, wherein two of the tables each contain real amplitude values of d-variables and q-variables and wherein two further tables each contain imaginary amplitude values of the d-variables and the q-variables. Finally, in order to generate a setpoint variable w for driving the electric machine 10, variables can be read from a table containing in particular only amplitude variables, wherein further required variables are determined according to a predetermined rule.

The disclosure is not limited to the embodiments shown in the figures. The above description is therefore not to be regarded as restrictive, but rather as explanatory. The following claims are to be understood as meaning that a named feature is present in at least one embodiment of the disclosure. This does not exclude the presence of further features.

If the patent claims and the above description define "first" and "second" features, this designation serves to distinguish between two features of the same type without defining an order of precedence.

LIST OF REFERENCE SIGNS

10 Electric machine
20 Load (drive train)
30 Power electronics unit
40 Battery/energy source
50 Control/regulation unit
60 Setpoint generator
61 Torque part
62 Harmonic part
63 Table part
100 Drive train

The invention claimed is:

1. A method for modulating at least one of a torque ripple and a radial force of a three-phase current-operated electric machine, comprising:
   selecting at least one of a harmonic ($H_{M1\_EM}$) in a torque of the electric machine and a harmonic ($H_{M\_x}$) of a load coupled to the electric machine;
   wherein the at least one selected harmonic ($H_{M1\_EM}$, $H_{M\_x}$) is modulated by applying the at least one selected harmonic ($H_{M1\_EM}$, $H_{M\_x}$) to at least one of a d-current and a q-current or to a variable correlated therewith in order to generate a setpoint variable for driving the electric machine;
   wherein a phase angle ($\varphi_{d,k}$, $\varphi_{q,k}$) of at least one of a harmonic ($H_{Id}$) in the d-current and a harmonic ($H_{Iq}$) in the q-current is, at least temporarily, set to be different with respect to a rotor angle, such that $\varphi_{d,k} \neq \varphi_{q,k}$ applies;
   wherein at least one of the d-current and the q-current is selected in such a way that a magnitude of a resulting stator voltage $$|u|=\sqrt{u_d^2+u_q^2}$$

or a magnitude of the resulting stator current $$|i|=\sqrt{i_d^2+i_q^2}$$

is minimized, where $$u_d = R \cdot i_d + \frac{d\Psi_d(i_d, i_q, \gamma)}{dt} - \omega\Psi_q(i_d, i_q, \gamma);$$

and $$u_q = R \cdot i_q + \frac{d\Psi_q(i_d, i_q, \gamma)}{dt} - \omega\Psi_d(i_d, i_q, \gamma).$$

2. The method according to claim 1, wherein the at least one selected harmonic is modulated such that at least one of the torque of the electric machine and a torque of the load is smoothed out to reduce vibrations and noise.

3. The method according to claim 1,
   further comprising calculating the harmonic in at least one of the d-current and the q-current by:
   modulating the torque of the electric machine to minimize the torque ripple by taking into account at least one of an induced voltage and the radial force or to minimize the radial force by taking into account the induced voltage;
   generating at least one of the torque ripple and the radial force by taking into account the induced voltage, and modulating the induced voltage by taking into account at least one of the torque ripple and the radial force.

4. The method according to claim 1,
   wherein, to generate the setpoint variable for driving the electric machine, the d-current, the q-current, the phase angle of the harmonic ($H_{Id}$) in the d-current, and the phase angle of the harmonic ($H_{Iq}$) in the q-current are read from a table.

5. The method according to claim 4,
   wherein the d-current, the q-current, the phase angle of the harmonic ($H_{Id}$) in the d-current, and the phase angle of the harmonic ($H_{Iq}$) in the q-current are read from four different tables, wherein two of the tables each contain amplitudes of d-variables and q-variables, and wherein two further tables each contain associated phases of the d-variables and the q-variables.

6. The method according to claim 4, wherein the d-current, the q-current, the phase angle of the harmonic ($H_{Id}$) in the d-current, and the phase angle of the harmonic ($H_{Iq}$) in the q-current are read from four different tables, wherein two of the tables each contain real amplitude values of d-variables and q-variables, and wherein two further tables each contain imaginary amplitude values of the d-variables and the q-variables.

7. The method according to claim 4,
   wherein some of the d-current, the q-current, the phase angle of the harmonic ($H_{Id}$) in the d-current, and the phase angle of the harmonic ($H_{Iq}$) in the q-current are read from a table containing variables, and some of the d-current, the q-current, the phase angle of the harmonic ($H_{Id}$) in the d-current, and the phase angle of the harmonic ($H_{Iq}$) in the q-current are determined according to a predetermined rule.

8. The method according to claim 1, wherein the load is a drive train of a motor vehicle.

9. The method according to claim 1, wherein the variable correlated with the at least one of the d-current and the q-current is one of a stator voltage or a magnetic flux of the electric machine.

10. A method for modulating at least one of a torque ripple and a radial force of a three-phase current-operated electric machine, comprising:
    selecting at least one of a harmonic ($H_{M1\_EM}$) in a torque of the electric machine and a harmonic ($H_{M\_x}$) of a load coupled to the electric machine;
    modulating the at least one selected harmonic ($H_{M1\_EM}$, $H_{M\_x}$) by applying the at least one selected harmonic ($H_{M1\_EM}$, $H_{M\_x}$) to a d-current and/or to a q-current to generate dynamic input variables;
    setting, at least temporarily, at least one of a phase angle of a harmonic ($H_{Id}$) in the d-current and a phase angle of a harmonic ($H_{Iq}$) in the q-current to be different from a rotor angle; and
    generating setpoint variables for driving the electric machine based on the dynamic input variables, wherein at least one of the d-current and the q-current is selected in such a way that a magnitude of a resulting stator voltage or a magnitude of a resulting stator current is minimized.

11. The method according to claim 10, wherein the phase angle of the harmonic ($H_{Id}$) in the d-current is different from the phase angle of the harmonic ($H_{Iq}$) in the q-current.

12. The method according to claim 10, wherein the load is a drive train of a motor vehicle.

13. The method according to claim 10, wherein the magnitude of the resulting stator voltage is dependent on a speed of the electric machine and a change in a magnetic flux in the electric machine.

14. The method according to claim 13, wherein the torque of the electric machine is dependent on the magnetic flux, the d-current, and the q-current.

15. The method according to claim 10, further comprising calculating the at least one phase angle by:
    modulating the torque of the electric machine;
    minimizing the torque ripple based on at least one of an induced voltage and the radial force;
    generating the torque ripple based on the induced voltage; and
    modulating the induced voltage based on the torque ripple.

16. The method according to claim 15, further comprising calculating the at least one phase angle further by:
    modulating the radial force of the electric machine;
    minimizing the radial force based on at least one of the torque ripple and the induced voltage;
    generating the radial force based on the induced voltage; and
    modulating the induced voltage based additionally on the radial force.

17. The method according to claim 10, further comprising calculating the at least one phase angle by:
    modulating the radial force of the electric machine;
    minimizing the radial force based on at least one of the torque ripple and an induced voltage;
    generating the radial force based on the induced voltage; and
    modulating the induced voltage based on the radial force.

18. The method according to claim 10, wherein the dynamic input variables are further generated by determining at least some of the d-current, the q-current, the phase angle of the harmonic ($H_{Id}$) in the d-current, and the phase angle of the harmonic ($H_{Iq}$) in the q-current via a table.

* * * * *